United States Patent [19]

Hasebe et al.

[11] Patent Number: 5,363,211
[45] Date of Patent: Nov. 8, 1994

[54] IMAGE PROCESSING APPARATUS HAVING MEANS FOR MAGNIFYING A PORTION OF A DOCUMENT SELECTED THROUGH COLOR MARKING

[75] Inventors: Takashi Hasebe; Satoshi Haneda, both of Hachioji, Japan

[73] Assignee: Konica Corporation, Tokyo, Japan

[21] Appl. No.: 93,868

[22] Filed: Jul. 20, 1993

[30] Foreign Application Priority Data

Jul. 24, 1992 [JP] Japan ................. 4-198632

[51] Int. Cl.$^5$ ........................... H04N 1/393
[52] U.S. Cl. ................... 358/451; 358/528; 382/47; 395/102
[58] Field of Search ............ 358/451, 452, 453, 448, 358/528, 537, 538; 395/102, 139; 382/47

[56] References Cited

U.S. PATENT DOCUMENTS

| | | | |
|---|---|---|---|
| 5,028,991 | 7/1991 | Sekizawa et al. | 358/537 |
| 5,051,927 | 9/1991 | Tada et al. | 395/139 |
| 5,153,737 | 10/1992 | Kobayashi . | |

FOREIGN PATENT DOCUMENTS

| | | |
|---|---|---|
| 357407 | 3/1990 | European Pat. Off. . |
| 388887 | 9/1990 | European Pat. Off. . |
| 157070 | 7/1987 | Japan . |
| 27369 | 1/1990 | Japan . |

Primary Examiner—Scott A. Rogers
Attorney, Agent, or Firm—Finnegan, Henderson Farabow, Garrett & Dunner

[57] ABSTRACT

An image processing apparatus for changing an image size wherein the document is marked with two kinds of color markers differing in color so as to be designated a pre-change region in which an image size is to be changed and a post-change region indicating a region after the image size has been changed. The apparatus comprises a condition detector to detect the pre-change region and the post-change region and obtains a magnification of the image size change on the basis of the pre-change region and the post-change region.

2 Claims, 18 Drawing Sheets

BEFORE PROCESSING IS CARRIED OUT

AFTER PROCESSING HAS BEEN CARRIED OUT

LET ME HAVE A LARGER BAG

LET ME HAVE A LARGER BAG

IMAGE REGION DESIGNATED TO BE PROCESSED (MARKER REGION IS DEFINED AS "A")

SIZE OF IMAGE TO BE PROCESSED FOR MAGNIFICATION (MARKER REGION IS DEFINED AS "B")

FIG. 14

| | | | | | | | | STRUCTURE OF EDITED DATA IN JUDGMENT INFORMATION MEMORY CIRCUIT |
|---|---|---|---|---|---|---|---|---|
| D7 | D6 | D5 | D4 | D3 | D2 | D1 | D0 | DESIGNATED CONTENT OF PROCESSING MODE |
| | | | | | | | 0 | NO HALF-TONE PROCESSING |
| | | | | | | | 1 | HALF-TONE PROCESSING REGION SIGNAL |
| | | | | | | 0 | | NO INVERSION PROCESSING |
| | | | | | | 1 | | INVERSION PROCESSING REGION SIGNAL |
| | | | | | 0 | | | NO TRIMMING PROCESSING |
| | | | | | 1 | | | TRIMMING PROCESSING REGION SIGNAL |
| | | | | 0 | | | | NO MASKING PROCESSING |
| | | | | 1 | | | | MASKING PROCESSING REGION SIGNAL |
| 0 | 0 | 0 | 1 | | | | | REGION SIGNAL INFORMATION (A) |
| 1 | 0 | 0 | 0 | | | | | DESIGNATED MARKER COLOR CONVERSION PROCESSING |
| | 1 | 0 | 0 | | | | | CONVERSION IN DESIGNATED COLOR MARKER : Y |
| | | 0 | 1 | | | | | CONVERSION IN DESIGNATED COLOR MARKER : M |
| | | 1 | 0 | | | | | CONVERSION IN DESIGNATED COLOR MARKER : C |
| | | 1 | 1 | | | | | REGION SIGNAL INFORMATION (B) |

FIG. 15 (a)

| FIG. 15a |
|---|
| FIG. 15b |

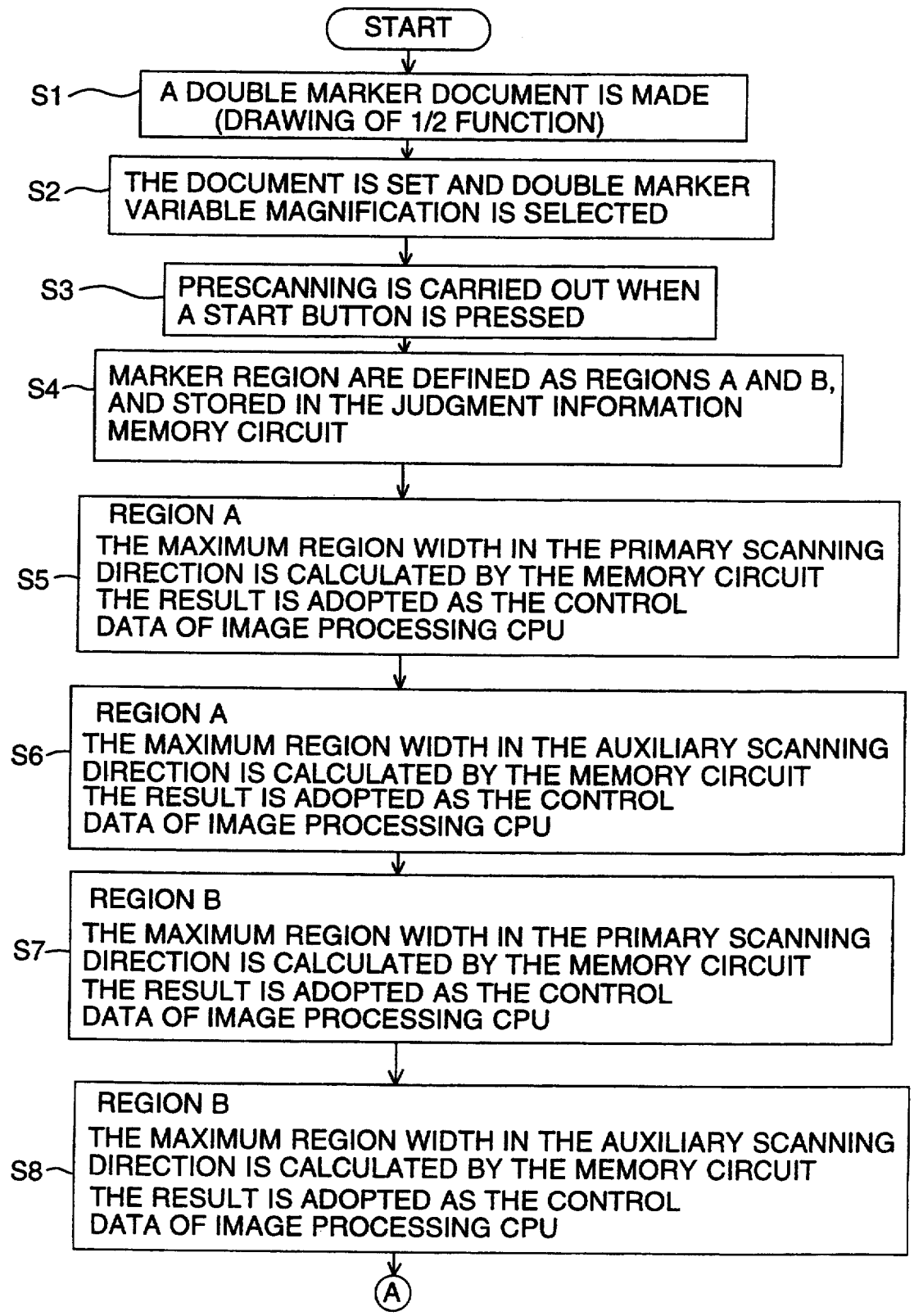

START

S1 — A DOUBLE MARKER DOCUMENT IS MADE (DRAWING OF 1/2 FUNCTION)

S2 — THE DOCUMENT IS SET AND DOUBLE MARKER VARIABLE MAGNIFICATION IS SELECTED

S3 — PRESCANNING IS CARRIED OUT WHEN A START BUTTON IS PRESSED

S4 — MARKER REGION ARE DEFINED AS REGIONS A AND B, AND STORED IN THE JUDGMENT INFORMATION MEMORY CIRCUIT

S5 — REGION A
THE MAXIMUM REGION WIDTH IN THE PRIMARY SCANNING DIRECTION IS CALCULATED BY THE MEMORY CIRCUIT
THE RESULT IS ADOPTED AS THE CONTROL DATA OF IMAGE PROCESSING CPU

S6 — REGION A
THE MAXIMUM REGION WIDTH IN THE AUXILIARY SCANNING DIRECTION IS CALCULATED BY THE MEMORY CIRCUIT
THE RESULT IS ADOPTED AS THE CONTROL DATA OF IMAGE PROCESSING CPU

S7 — REGION B
THE MAXIMUM REGION WIDTH IN THE PRIMARY SCANNING DIRECTION IS CALCULATED BY THE MEMORY CIRCUIT
THE RESULT IS ADOPTED AS THE CONTROL DATA OF IMAGE PROCESSING CPU

S8 — REGION B
THE MAXIMUM REGION WIDTH IN THE AUXILIARY SCANNING DIRECTION IS CALCULATED BY THE MEMORY CIRCUIT
THE RESULT IS ADOPTED AS THE CONTROL DATA OF IMAGE PROCESSING CPU (A)

| FIG. 15a |
|----------|
| FIG. 15b |

IMAGE PROCESSING APPARATUS HAVING MEANS FOR MAGNIFYING A PORTION OF A DOCUMENT SELECTED THROUGH COLOR MARKING

BACKGROUND OF THE INVENTION

The present invention relates to an image processing apparatus, and more particularly relates to an image processing apparatus in which a designated region on a document image is magnified or reduced to a size designated on the document.

Conventionally, a digital type copier has been well known which is composed in the following manner (disclosed in Japanese Patent Publication Open to Public Inspection No. 157070/1987): a document is optically scanned; the optical image is received by a photoelectric conversion element such as a line image sensor so that the optical image is converted into an electrical signal; this electrical signal is digitized so that digitized image information is provided; and an electrostatic latent image is formed on a photoreceptor by a writing device such as a semiconductor laser in accordance with the image information.

There is provided a digital type color copier provided with editing function to edit and process image information in the manner of color conversion, trimming, inversion, masking and half-tone (disclosed in Japanese Patent Publication Open to Public Inspection No. 27369/1990).

In the case of image processing based on region designation described above, when an image processing region is designated in accordance with information of a color different from a document color to be read, an image to be read is discriminated from information of region designation.

In this connection, the following case frequently arises in which the setting of variable magnification is made on the document in the case where a region on the document image is partially magnified, wherein the setting is not made by a value of variable magnification ratio. In the case of a conventional copier, the aforementioned region to be processed can be simply designated with a color marker, however, it is necessary to indicate a specific value of a variable magnification ratio. Therefore, when an actual variable magnification processing is made, the following operations are required: the size of a region on the image is measured, and the magnification ratio is calculated; or the document image is actually copied by an roughly estimated magnification ratio, and when a required image size is not provided, the magnification ratio is changed and the document image is copied again.

Also, in the conventional copier, image information obtained from the document is inputted into an editor, and variable magnification processing is made by the editor. In this case, it is necessary to display the obtained image information on a displaying device such as a CRT so as to set a magnifying condition. Accordingly, it is difficult to simply magnify an image at an optional magnification ratio.

SUMMARY OF THE INVENTION

The present invention has been achieved in consideration of the problems described above. It is an object of the present invention to provide an image processing apparatus in which the variable magnification ratio of an arbitrary region on a document is designated on the document and the region is subjected to variable magnification processing. Therefore, an arbitrary region can be simply subjected to variable magnification processing at an arbitrary variable magnification ratio.

In order to accomplish the objects, the image processing apparatus of the present invention comprises: a reading means that photoelectrically converts an optical image obtained when a document image is optically scanned, to an electrical signal so that color image information corresponding to the document image is provided; a variable magnification condition detecting means that detects a variable magnification processing region and variable magnification size indicated on the document image with a color marker in accordance with the color image information; and a variable magnification processing means that processes and outputs the image information of the variable magnification processing region detected by the variable magnification condition detecting means so that the document image can be magnified to the detected variable magnification size.

In this case, the apparatus of the present invention can be constituted in the following manner: the variable magnification processing region and size are respectively encircled and designated by a double closed loop with a color marker of different colors, wherein one closed loop represents the variable magnification processing region indicating a pre-change region in which an image size is to be changed, and the other closed loop represents the variable magnification size indicating a post-change region after the image size has been changed.

The variable magnification processing means may includes: a region size detection means that detects the size of the closed loop representing the variable magnification processing region and also detects the size of the closed loop representing the variable magnification size, wherein the detection is made in both the primary and auxiliary directions; and a variable magnification ratio setting means that compares the size of the primary scanning direction detected by the region size detection means with the size of the auxiliary scanning direction so that the variable magnification ratio of the primary scanning direction and that of the auxiliary scanning direction are independently set.

According to the image processing apparatus constituted in the manner explained above, the variable magnification processing region and size designated with a color marker on the document image can be detected, and the region designated according to the aforementioned detection result is magnified to the designated size and outputted.

That is, not only the image region to be magnified but also the magnification ratio can be set on the document image not by a numerical value but by a color marker.

When the variable magnification processing region and the variable magnification size are designated by a double closed loop of different colors, not only the variable magnification region but also the variable magnification size can be simply designated.

In the constitution in which the region and variable magnification size are designated by a closed loop with a color marker, a variable magnification ratio is set in the following manner: the size of each closed loop is detected with respect to the primary and auxiliary scanning directions; and the sizes of two closed loops are compared with respect to the primary and auxiliary scanning directions.

Accordingly, when a closed loop is designated with a color marker, the longitudinal or lateral size of a document image can be arbitrarily magnified, so that a variably magnified image in a predetermined range can be formed.

BRIEF DESCRIPTION OF THE DRAWINGS

FIG. 14 is a table showing constitution of editing data for carrying out marker editing processing;

DETAILED DESCRIPTION OF THE PREFERRED EMBODIMENT

With reference to the attached drawings, an example of the present invention will be explained as follows.

In this example explained below, an image processing apparatus of the present invention is applied to a digital type color copier.

Figure 1:
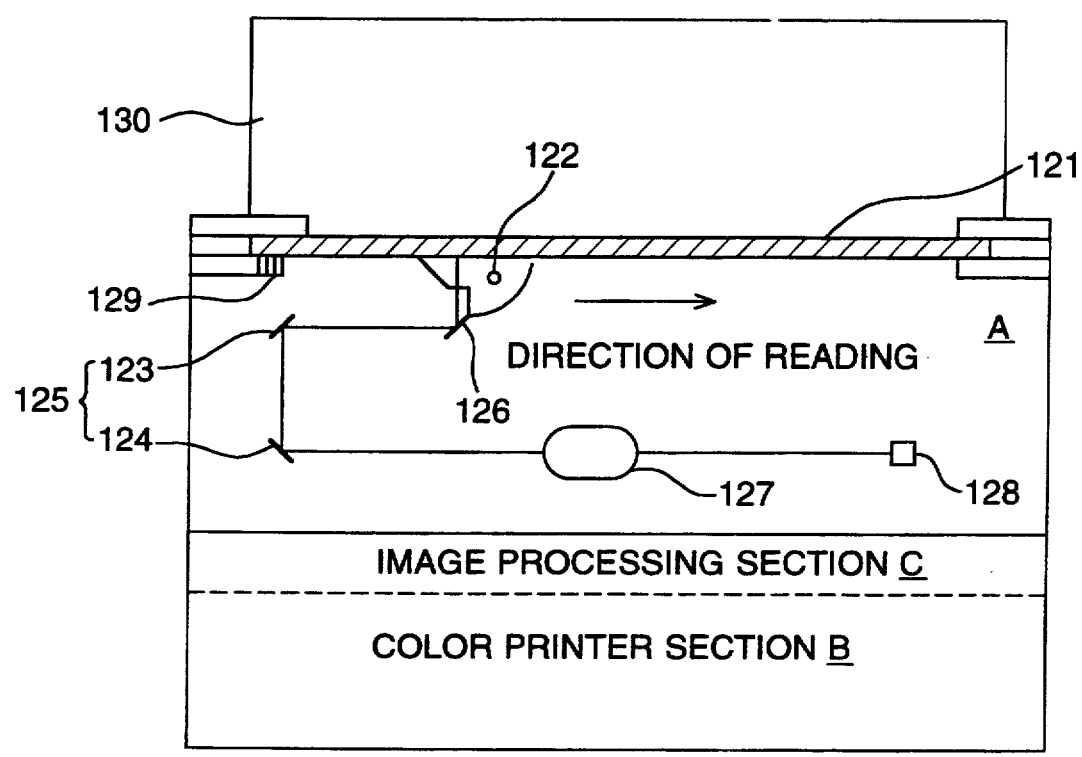
FIG. 1 is a schematic illustration showing the entire structure of a digital type color copier of an example of the present invention.

FIG. 1 is schematic illustration showing the entire structure of a digital type color copier of an example of the present invention.

As shown in FIG. 1, the digital color copier includes a color scanner section A, color printer section B and image processing section C.

In color scanner section A (reading means), a document is placed on a platen glass 121 and optically scanned by a halogen light source 122 moved in a lateral direction (auxiliary scanning direction) in the drawing. A movable mirror unit 125 composed of two mirrors 123 and 124 is optically combined with a mirror 126 attached to the halogen light source 122, and the combined mirrors reflect light of an optical image sent from the document on the platen glass 121. Then, the image is formed on a color CCD 128 through a lens 127.

The optical image (image information) formed on color CCD 128 is photoelectrically converted into a color image signal (in this example, three primary color signals of R, G and B), and this image signal is outputted to image processing section C. As described later, in image processing section C, the color image signal is subjected to various processing such as density conversion, color reproduction processing, marker editing processing, spatial filter processing and variable magnification processing. After the processing has been completed, this color image signal is outputted to color printer section B.

In color printer section B, a laser beam is modulated in accordance with the inputted image signal, and projected on a photoreceptor drum surface that has been uniformly charged, so that an electrostatic latent image is formed for each toner color (for example, yellow Y, magenta M, cyan C and black Bk). The electrostatic latent image of each color is developed by a developing unit of each color, and superimposed so that a color image can be formed. The obtained color image is transferred onto a recording paper. In this way, a color copy of the document can be made.

In FIG. 1, numeral 129 is a reference density section for correcting shading, and numeral 130 is a document cover.

Referring to the attached drawings FIGS. 2 to 9, the circuit structure of image processing section C will be explained as follows.

Figure 2:
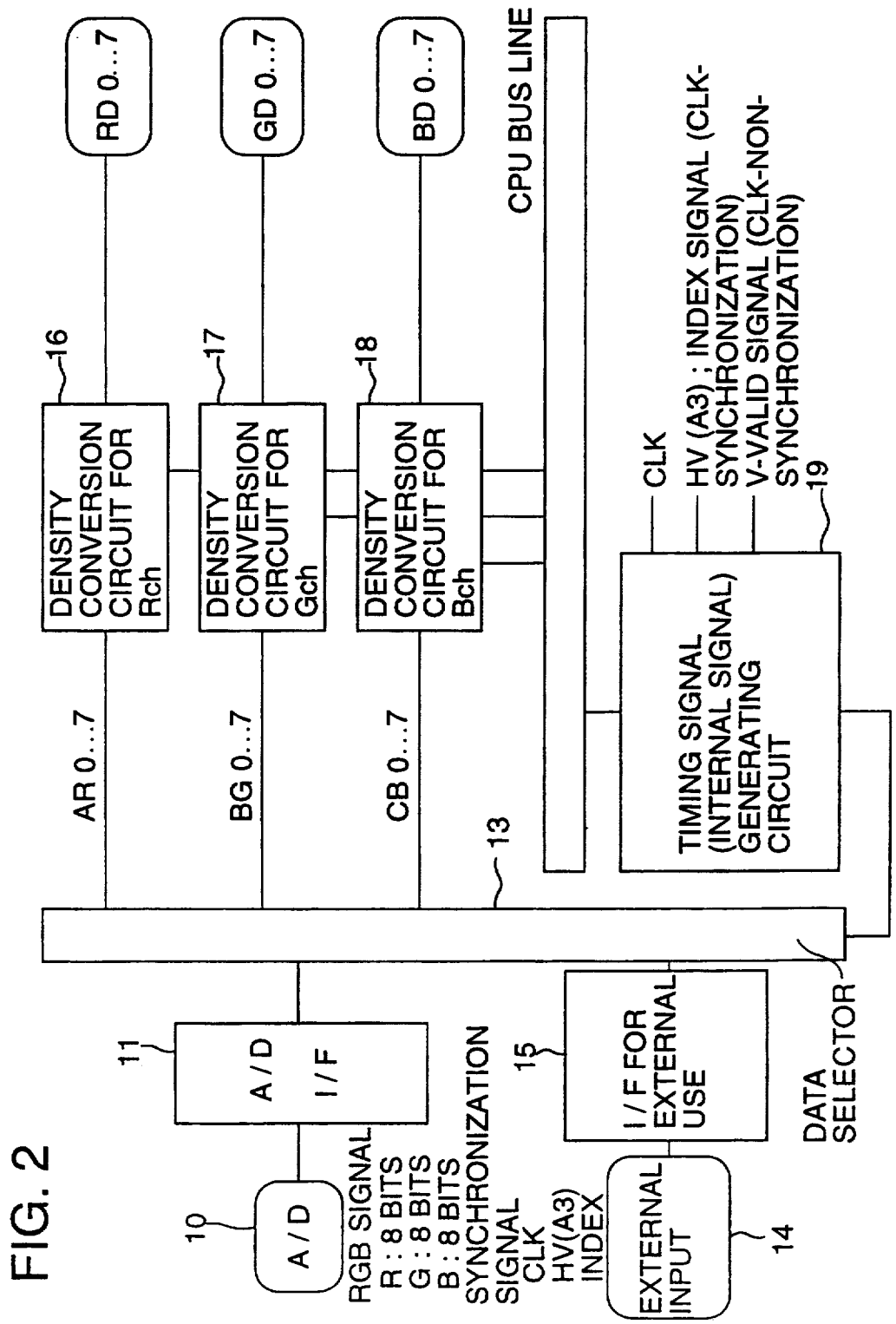
FIG. 2 is a block diagram showing an input and density conversion section of an image processing section.

FIG. 2 is a color image information input section and a density conversion section of image processing section C.

In FIG. 2, three primary color image signals (analog signals) of red R, green G and blue B outputted from color CCD 128 of color scanner section A are converted into a digital signal by an A/D converter 10. The digitized color image information is inputted into a date selector 13 through an interface 11.

Image data sent from an external device such as a film projector can be inputted into the data selector 13 through an external input terminal 14 and external interface 15.

The digital type color copier of this example functions as an image forming apparatus that can form an image in accordance with not only an image signal obtained through document image reading but also an image signal sent from an external apparatus.

Digital image signals AR, BG and CB of R, B and G outputted from the data selector 13 are converted into image density data RD, GD and BD for each primary color by density conversion circuits 16, 17 and 18.

In FIG. 2, numeral 19 is a timing signal generation circuit. Not only clock signal CLK but also synchronization signals H-V and V—V obtained from the writing unit B are provided to the timing generation circuit 19 so that various timing signals are formed in accordance with these signals, wherein signal H-V is a signal in the primary scanning direction (the direction of element line of color CCD 128) and signal V—V is a signal in the auxiliary scanning direction (optical scanning direction).

Figure 3:
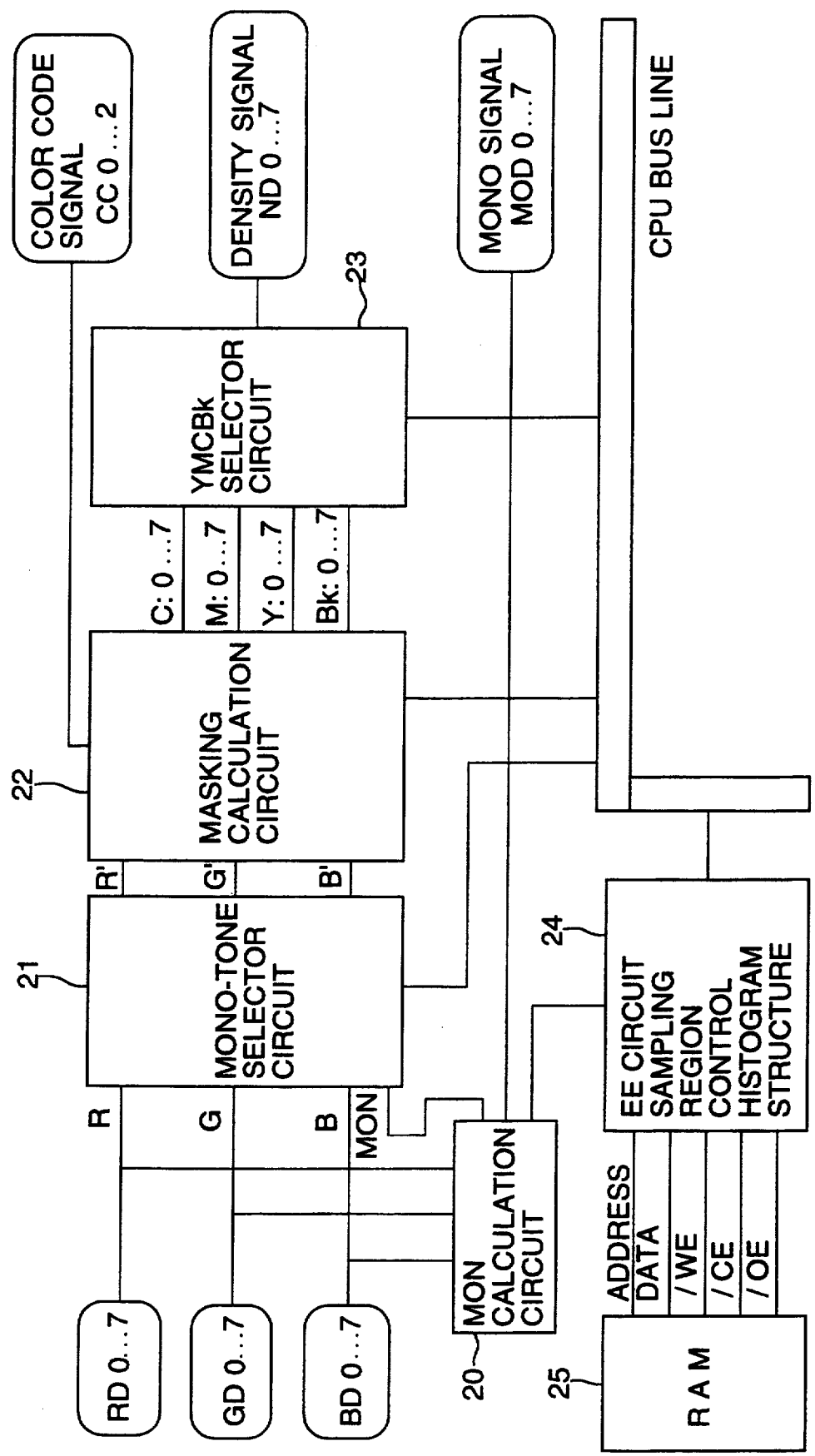
FIG. 3 is a block diagram showing a color reproduction and EE circuit section of the image processing section.

Density data RD, GD and BD is further processed by color reproduction and EE circuits illustrated in FIG. 3.

As shown in FIG. 3, density data RD, GD and BD is inputted into an MON calculation circuit 20, and density data signal MOD for mono-tone color reproduction is calculated in this MON calculation circuit 20. In the mono-tone selector circuit 21 into which density data MOD, RD, GD and BD is inputted, three primary density data is selected and outputted according to the copy mode such as the copy mode of sepia and that of mono-tone. In other words, in this example, document images can be processed and outputted as a monochromatic image of a chromatic color such as sepia.

In a masking circuit 22 into which density data is inputted from the mono-tone selector circuit 21, color discrimination is carried out for each pixel, and a color code signal CC is outputted, which shows the attribution of each pixel, for example, each pixel belongs to which color of black Bk, yellow Y, magenta M, cyan C and white W.

Moreover, in the masking circuit 22, density information of R, G and B is converted into density data of yellow Y, magenta M, cyan C and black Bk, and then outputted. Density data of each color of Y, M, C and Bk is selected by the selector circuit 23. Then, color code signal CC and density data corresponding to color code signal CC are outputted.

In FIG. 3, EE circuit 24 controls the sampling region of image data according to the information of a density histogram, and RAM 25 is a work memory used for making the density histogram.

Figure 4:
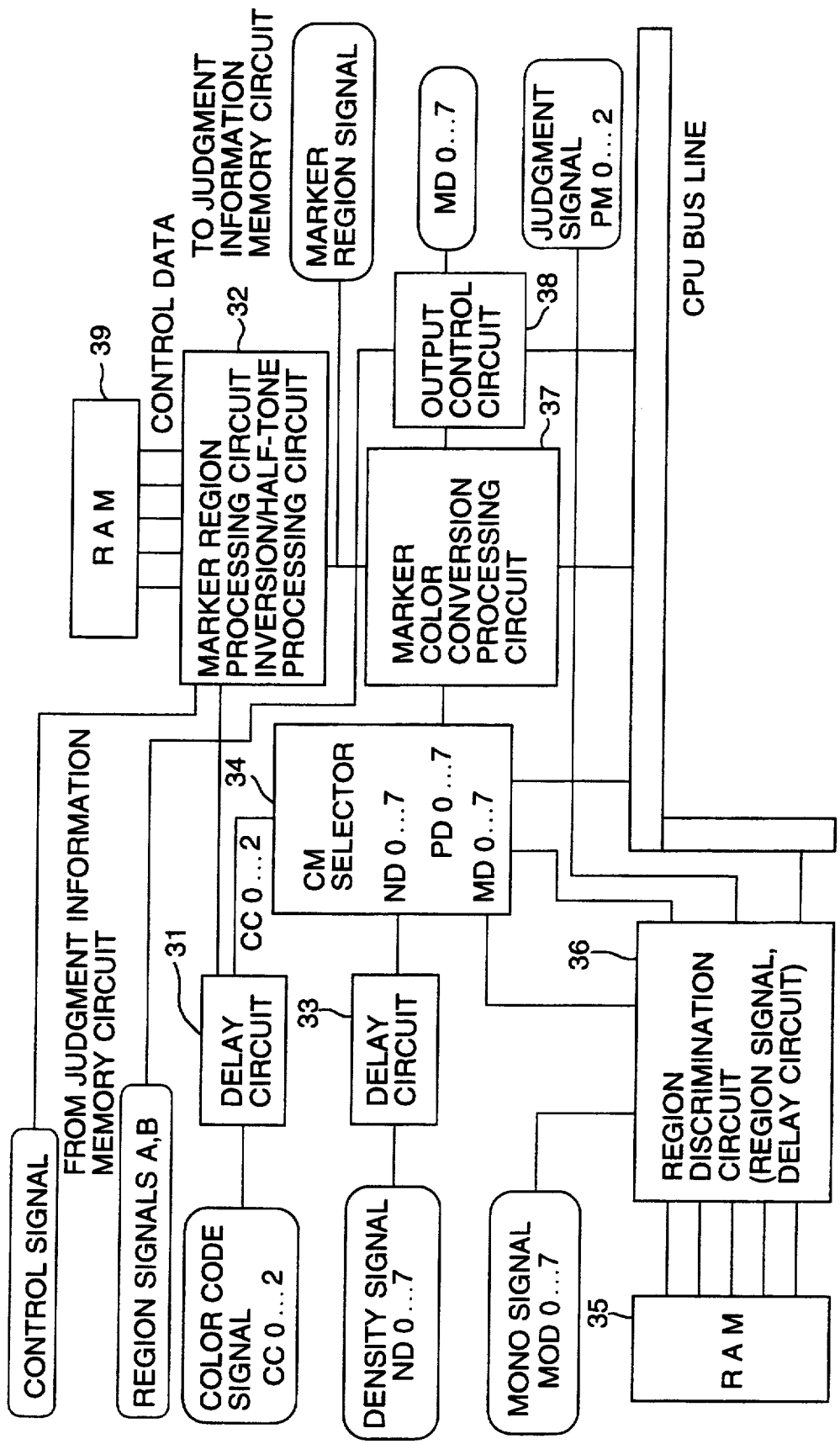
FIG. 4 is a block diagram showing a marker editing processing section of the image processing section.

Color code signal CC, density signal ND showing its density data, and further density signal MOD for mono-tone reproduction are successively processed by a marker editing section shown in FIG. 4.

In FIG. 4, in a prescanning operation, a marker region processing circuit inversion/half-tone processing circuit 32 detects an image processing region designated to be a closed loop with a marker pen in accordance with color code signal CC inputted through a delay circuit 31, and then a marker region signal is outputted. The marker region signal is stored in a judgment information memory circuit 105 described later.

On the other hand, in a main scanning operation, the processing of marker region inversion, half-tone, masking and trimming is carried out in accordance with a processing mode for each pixel corresponding to the marker designating region detected in the aforementioned prescanning process.

In a marker color conversion processing circuit 37, in the case where partial color conversion processing, which is one of marker editing processing operations, is designated, the color of an image in the marker region is converted into a color of the marker pen used for region designation, and the converted image is outputted through an output control circuit 38.

In RAM 39, various control data used for detection of a marker designating region, inversion and half-tone is stored.

Density signal ND corresponding to color code signal CC is inputted into a color mono-tone selector 34 through a delay circuit 33, and further color code signal CC is inputted through a delay circuit 31, and moreover mono-tone density signal MD is inputted through a region discrimination circuit 36 described later, and density data for color copying and density data for monochromatic copying are selectively outputted to a marker color conversion processing circuit 37.

Mono-tone density signal MOD is inputted into the region discrimination circuit 36. Then, in accordance with mono-tone density signal MOD, it is discriminated whether or not a document image is a photographic image having gradation, and also it is discriminated whether or not the document image is a character and line image composed of characters and lines. The result of discrimination is outputted as a discrimination signal PM for each pixel. In this connection, in FIG. 4, numeral 35 is a RAM that is a work memory provided in the region discrimination circuit 36.

Figure 5:
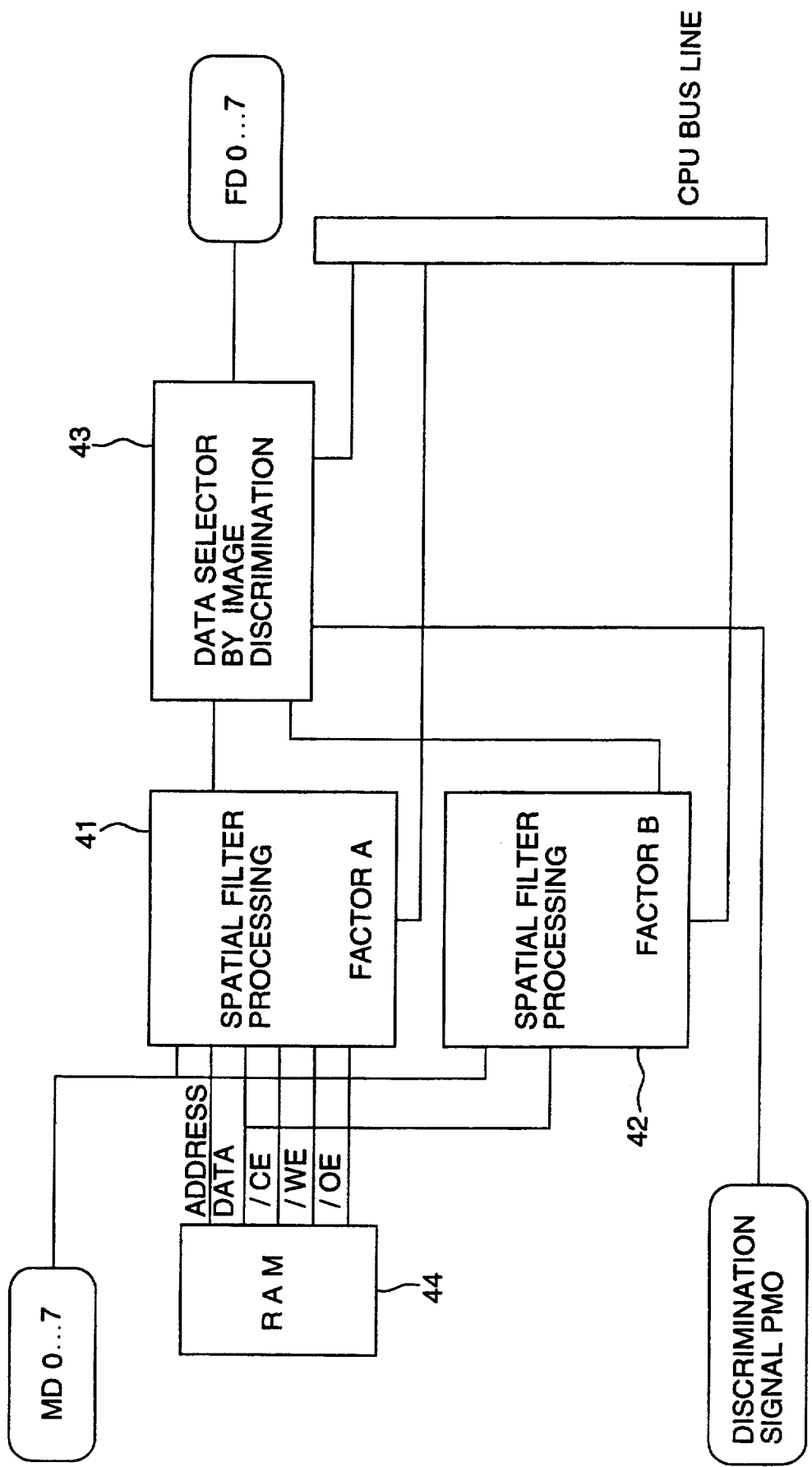
FIG. 5 is a block diagram showing an spatial filter processing section of the image processing section.

Density signal MD outputted through the output control circuit 38 after it has been edited with a marker, is subjected to gradation conversion processing in the spatial filter processing section shown in FIG. 5.

The spatial filter processing circuit includes two spatial filter processing circuits 41 and 42 that conduct gradation conversion in accordance with different factors A and B. Density data that has been subjected to gradation processing is selected by the data selector 43 in accordance with discrimination signal PM, and selected data is outputted as density data FD.

In other words, the characteristics of gradation processing can be automatically changed to sharp or soft in accordance of an image to be processed, that is, when a document image is a photographic one, or a character and line one, the characteristics of gradation processing can be automatically changed.

In FIG. 5, numeral 44 is a RAM used as a work memory for spatial filter processing calculation.

Figure 6:
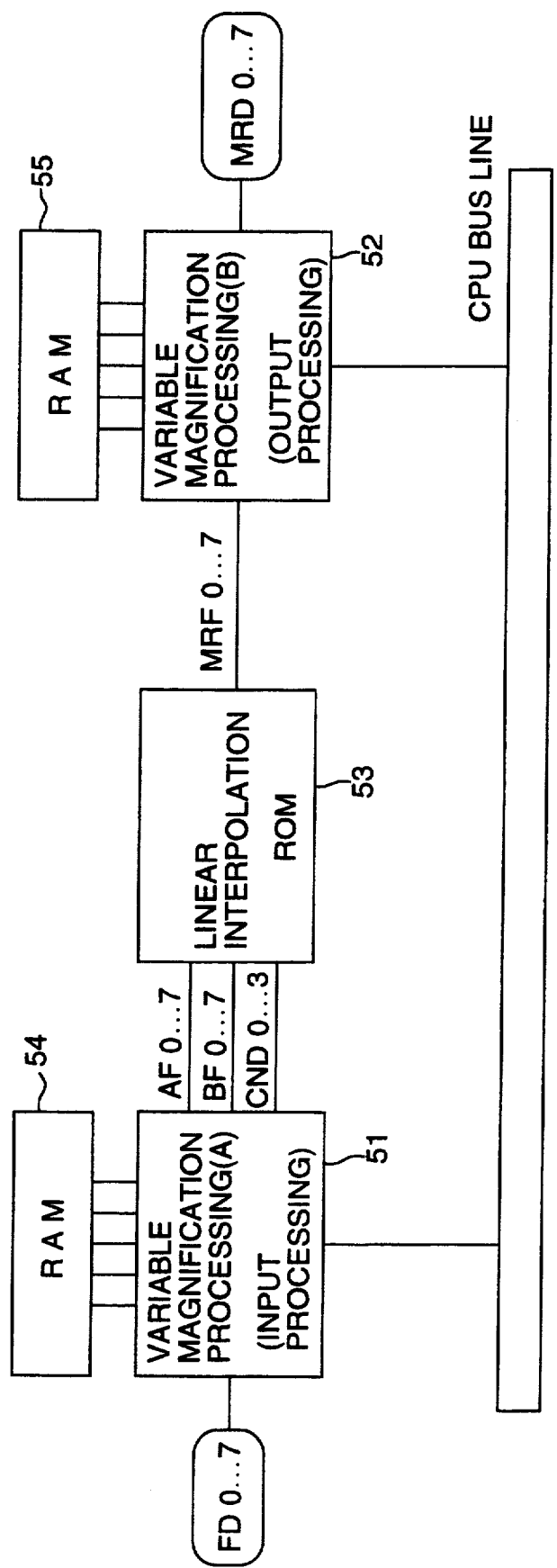
FIG. 6 is a block diagram showing a variable magnification processing section of the image processing section.

Density data FD that has been subjected to gradation conversion processing in the spatial filter processing circuit shown in FIG. 5, is successively sent to a variable magnification processing section shown in FIG. 6.

The variable magnification processing section includes an input side variable magnification processing circuit (A) 51, output side variable magnification processing circuit (B) 52, linear interpolation table (ROM) 53, and RAM 54 and 55 attached the variable magnification processing circuits (A) and (B).

By the aforementioned structure, image processing is performed for magnifying or reducing a document image in accordance with a variable magnification ratio that has been selected and directed. For example, in the case of magnifying processing, density data adjoining in the direction of sensor element row (the primary scanning direction) is linearly interpolated and outputted as conversion data. In the case of reducing processing, input density data is thinned out in the direction of CCD sensor element row (the primary scanning direction) and outputted as conversion data. Concerning the auxiliary scanning direction (the optical scanning direction, that is, the direction in which the halogen lamp 122 is moved) perpendicular to the primary scanning direction, an amount of data is increased or decreased for magnifying or reducing the document image when the reading speed (the scanning speed) is changed.

The variable magnification means of this example is composed of the variable magnification processing section shown in FIG. 6 when the reading speed is variably controlled.

Figure 7:
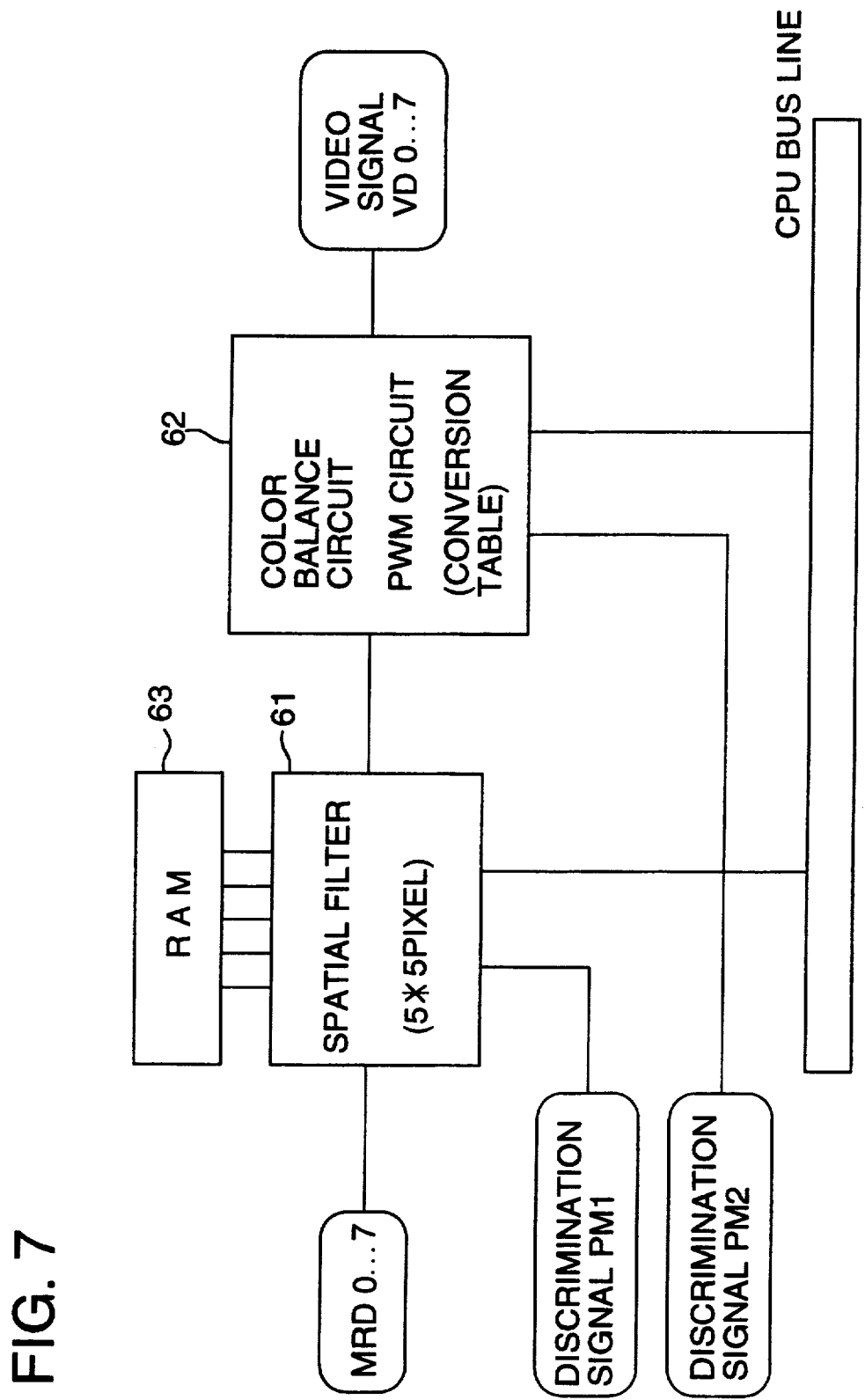
FIG. 7 is a block diagram showing a color balance processing section of the image processing section.

In order to prevent the occurrence of moire caused when an image is magnified or reduced, density data MRD in which variable magnifying processing has been performed is processed by the color balance processing section shown in FIG. 7.

In FIG. 7, first, density data MRD that has been subjected to magnifying and reducing processing is processed by the spatial filter 61, and the color balance is adjusted by the color balance circuit (PWM circuit) 62. After that, the density data is converted into video signal VD.

Video signal VD is supplied to color printer section B, and an image corresponding to video signal VD is formed on a recording paper so that a copy of the original document can be provided.

In FIG. 7, numeral 63 is a RAM used for calculation of the spatial filter 61.

Figure 8:
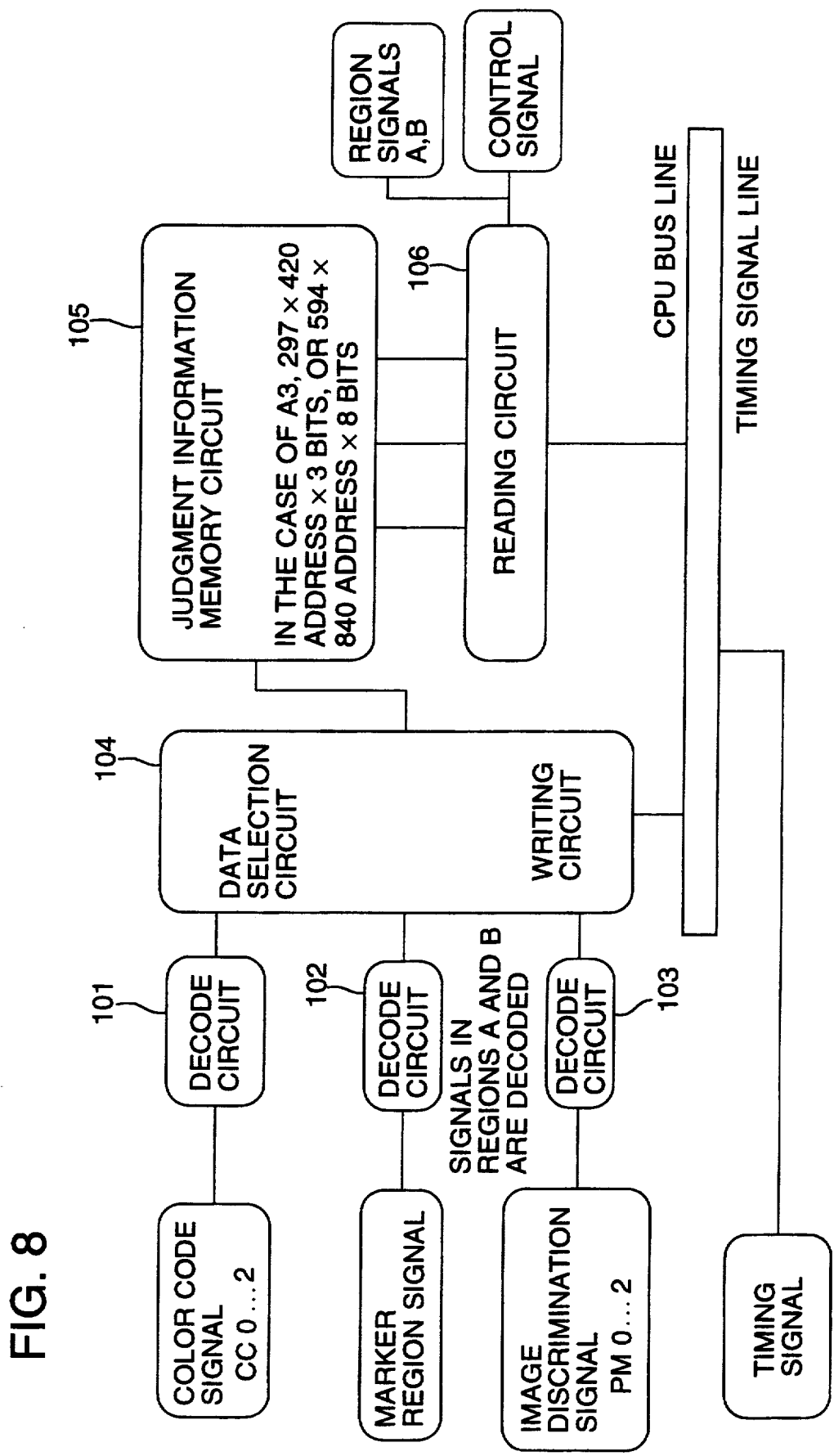
FIG. 8 is a block diagram showing a processed document discrimination data unit of the image processing section.

FIG. 8 is a schematic illustration showing a processing document discrimination data unit that stores various image judgment information provided through prescanning.

The color code signal, marker region signal and image discrimination signal PM, which have been obtained through prescanning, are respectively decoded by the decoding circuits 101, 102 and 103, and written in the judgment information memory circuit 105 through the writing circuit 104. They are stored as editing data for each pixel together with processing mode information given by CPU 71 described later.

Various image judgment information stored in the judgment information memory circuit 105 is read by CPU 71 described later through the reading circuit 106. Marker region signals (A and B in this example as described later) obtained through the reading processing and a control signal representing a processing mode are given to the marker region processing circuit 32 and the output control circuit 38 in the process of main scanning.

Figure 9:
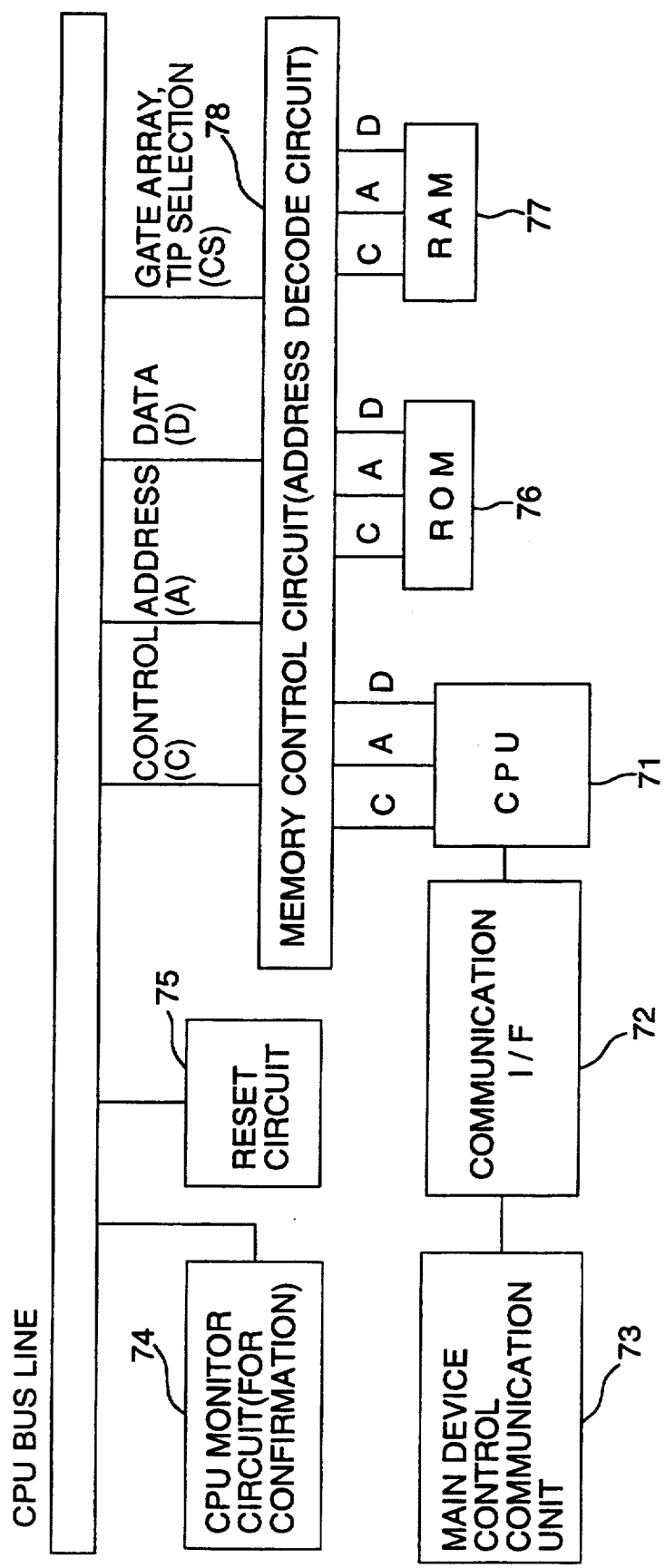
FIG. 9 is a block diagram showing a microcomputer section of the image processing section.

FIG. 9 is a view showing CPU 71 controlling each processing circuit, and also showing a microcomputer section composed of the peripheral circuits. Each processing circuit shown in FIGS. 2 and 8 and CPU 71 are connected through CPU bus line.

CPU 71 sends a signal of recording paper designation and also sends a signal representing the result of document size detection, to the communication unit 73 of the printer main body (writing unit B and image forming section C) through the communication interface 72.

Besides the aforementioned structure, the CPU monitor circuit 74, reset circuit 75, ROM 76, RAM 77 and address decoder 78 are shown in FIG. 9.

The function of partial variable magnification processing of this example in which a color marker is used will be explained as follows.

First, when an operator encircles a region on a document with a color marker so that a closed loop can be formed, a variable magnification region is designated. At the same time, the operator encircles the region with another marker for the purpose of designating a magnification ratio of the region, thereby the region is encircled by a double loop.

Figure 10:
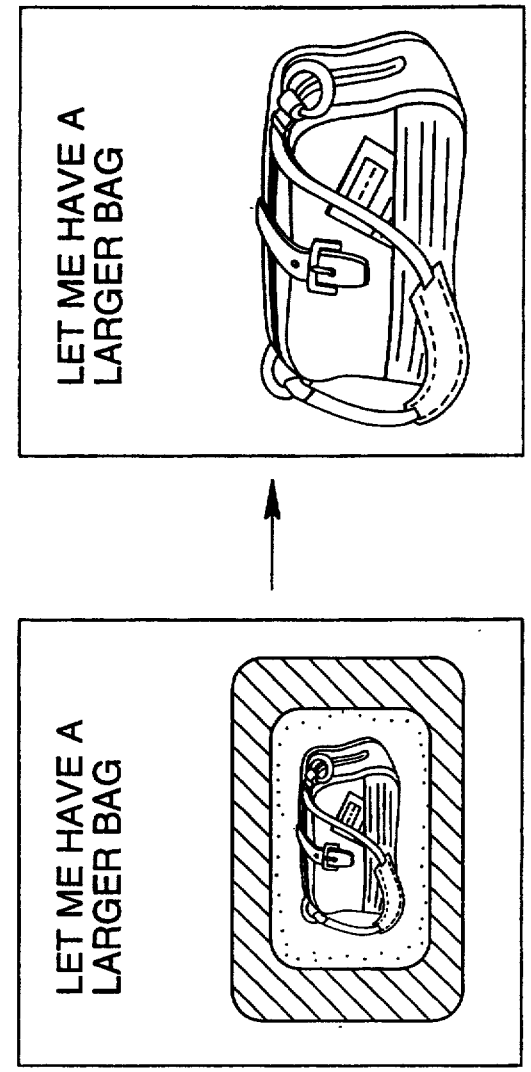
FIG. 10 is a schematic illustration showing an enlarged image in the double marker variable magnification processing.

That is, as shown in FIG. 10, in the case where only the illustration portion of a bag is copied by a magnified size and the character portion is copied by a life size, the illustration portion is encircled with a color marker so that a closed loop can be formed, and further the outside of the closed loop is encircled with another color marker for indicating an image region after magnification (a magnification size), thereby the illustration portion is encircled by the double loop. In this connection, the color of the marker indicating the variable magnification region and that of the marker indicating the variable magnification size are different (for example, red and blue).

The document described above is set on a digital type color copier having the aforementioned structure, and the double marker variable magnification mode is selected so that a reading operation is performed. Then, in a prescanning process, in the marker region processing circuit 32, closed loops respectively indicating variable magnification processing region A and variable magnification size B are discriminated and detected by means of color discrimination, so that the variable magnification processing region and the variable magnification ratio (variable magnification size) are recognized. On the basis of the result of the recognition, in the process of main scanning, partial variable magnification processing is carried out in accordance with the indication given by the color markers. The variable magnification processing in which the variable magnification region and size are designated by a double closed loop of different color markers is referred to as double marker variable magnification, hereinafter.

In this example, the variable magnification condition detection means includes the marker region processing circuit 32, CPU 71, and judgment information memory circuit 105 to store the region signal.

Accordingly, when the operator indicates variable magnification processing region A and variable magnification size B (variable magnification region) on a document with markers of two colors, a desired region can be magnified by a desired ratio without setting a numerical magnification ratio. Therefore, in the case where a specific region is required to be magnified to an arbitrary size, it is not necessary for the operator to calculate the magnification ratio, and an editor is not necessary, either. Consequently, partial variable magnification of an arbitrary magnification ratio can be performed through a simple operation.

Colors to be used may be previously specified so as to designate colors corresponding to the variable magnification processing region and size (or the operator may select the colors to designate the variable magnification processing region and size). In this way, colors may designate the variable magnification region and size. Alternatively, the double marker variable magnification mode may be divided into an enlarging mode and a reducing mode. In the case of the enlarging mode, the inside closed loop may indicate the variable magnification processing region, and the outside closed loop may indicate the variable magnification size.

Figure 11:
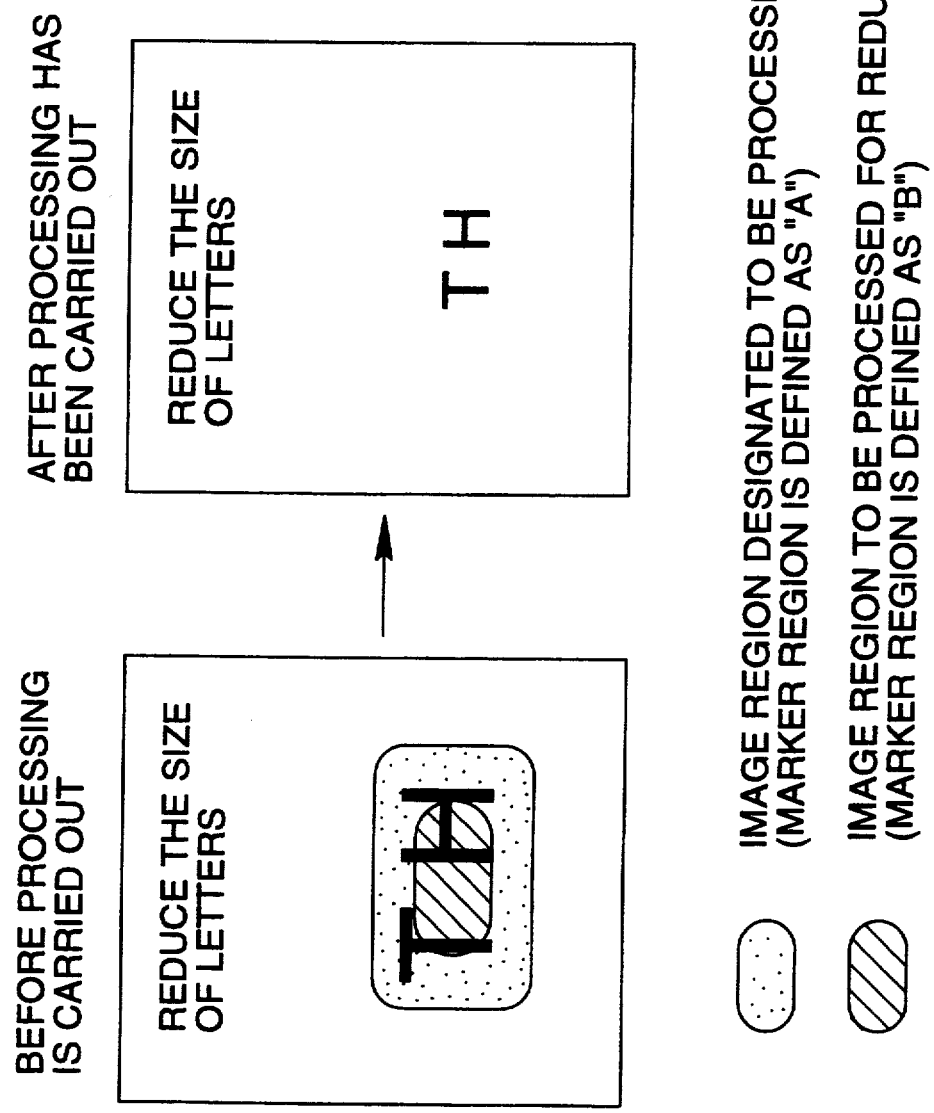
FIG. 11 is a schematic illustration showing a reduced image in the double marker variable magnification processing.

In the case where reduction processing is performed in a specific region, image region A (variable magnification region) to be reduced is encircled with a color marker so that a closed loop can be formed as shown in FIG. 11, and at the same time, a closed loop of different color is formed inside the aforementioned loop so that image region B (variable magnification size) after reduction can be indicated. As a result of the foregoing, the variable magnification region and size can be respectively detected, and when a comparison is made between the two, the variable magnification ratio can be found. Accordingly, an image in the region designated with a color marker can be reduced to the size also designated with another color marker.

When a document, the variable magnification condition of which has been designated with a color marker in the aforementioned manner, is actually subjected to variable magnification processing, the variable magnification ratio is set in the following manner.

First, in accordance with a color image signal provided through prescanning, variable magnification processing region A and variable magnification size B (image region after variable magnification processing) are detected by the marker region processing circuit 32, and marker region signals A and B are stored in the judgment information memory circuit 105. Then, in accordance with stored region signals A and B, CPU 71 calculates a variable magnification ratio by which magnification is performed from region A to region B.

Figure 12:
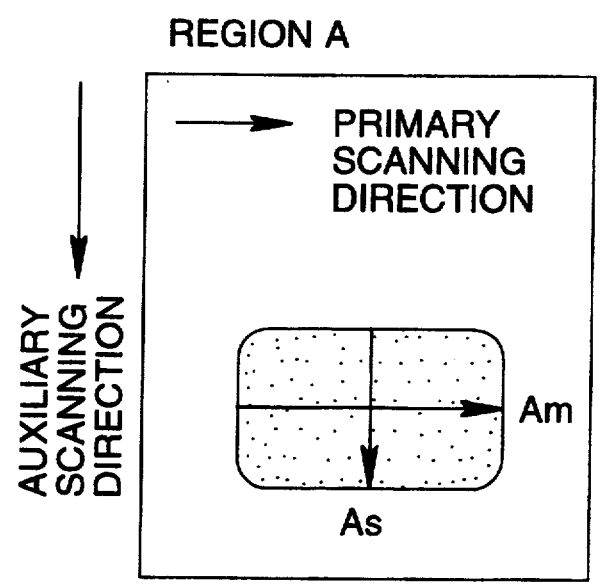
FIG. 12 is a schematic illustration showing circumstances of magnification ratio setting in the double marker variable magnification processing.
Figure 12:
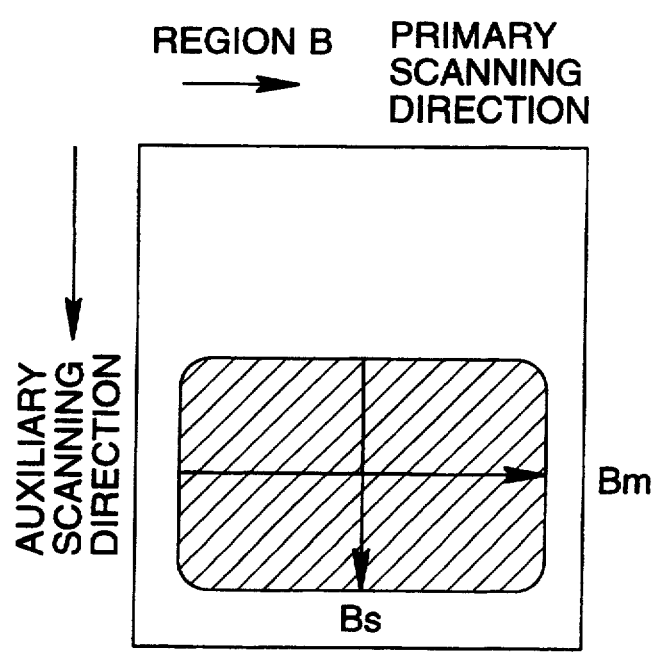
Figure 13:
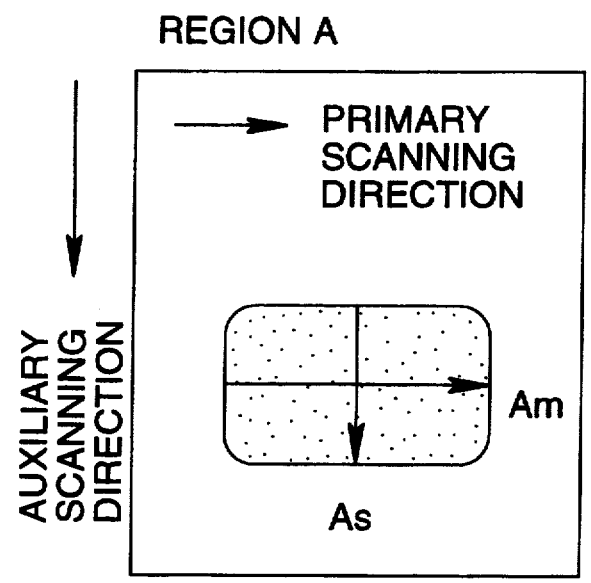
FIG. 13 is a schematic illustration showing circumstances of reduction ratio setting in the double marker variable magnification processing.
Figure 13:
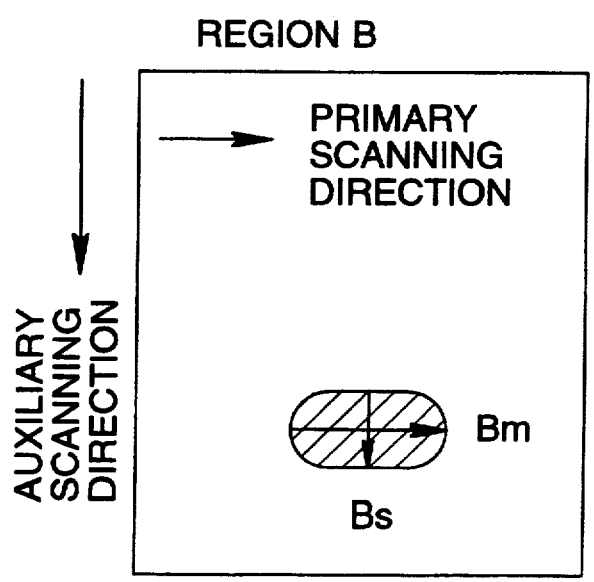

As shown in FIG. 12 (in the case of enlarging processing) and FIG. 13 (in the case of reducing processing), in the calculation of a variable magnification ratio, in accordance with stored marker region signals A and B, the maximum width Am in the primary scanning direction and the maximum width as in the auxiliary scanning direction of variable magnification processing region A is found in accordance with stored marker region signal A, and also the maximum width Bm in the primary scanning direction and the maximum width Bs in the auxiliary scanning direction of variable magnification size (region after variable magnification processing) B is found in accordance with stored marker region signal B.

Then, a variable magnification ratio in the primary scanning direction is calculated by Bm/Am, and a variable magnification ratio in the auxiliary scanning direction is calculated by Bs/As, and the obtained results are temporarily stored in the memory. In the process of main scanning, the stored variable magnification data in the auxiliary scanning direction is read through communication, and the read data is sent to the control system of the apparatus that controls the reading speed. Also, the variable magnification data in the primary scanning direction is outputted to the variable magnification processing circuit shown in FIG. 6, so that an actual variable magnification processing operation is performed.

A case will be explained as follows in which partial color conversion to convert to a marker color in a marker region and partial variable magnification of the marker region are combined and carried out.

For example, in the enlargement processing shown in FIG. 10, image formation is carried out in the following manner when: the variable magnification size is indicated with a blue marker; partial color conversion is performed to convert to the marker color (the marker color of the outside closed loop) used for indication of the variable magnification size; and toner colors used for color recording are yellow Y, magenta M, cyan C and black Bk.

(1) Y image formation (no image to be formed)
(2) M image formation (variable magnification image in the marker region)
(3) C image formation (variable magnification image in the marker region)
(4) Bk image formation (life size image outside the marker region)

In the aforementioned case, with respect to a designated region to be subjected to variable magnification is outputted by blue. Therefore, in order to provide blue, it is necessary to form a magenta M toner image and a cyan C toner image.

A life size image is formed from black Bk toner.

Consequently, in the formation of M and C images, image reading is performed while the reading speed (scanning speed) is changed in accordance with the aforementioned variable magnification ratio Bs/As. Then, marker editing processing is performed in the following manner: trimming processing is conducted so that only marker region A is recorded; color conversion processing is conducted so that marker region A is converted to blue; and in the variable magnification processing circuit, linear interpolation is conducted in the primary direction in accordance with variable magnification ratio Bm/Am. Then, image data in the marker region that has been subjected to variable magnification and color conversion processing is supplied to color printer section B so that M and C images can be formed.

The present color conversion is performed for converting to blue by superimposing M and C images. Therefore, it is not necessary to form a yellow Y toner image. Accordingly, the yellow Y toner image is not formed.

Bk image formation is performed with respect to a life-size image, that is, an image outside the marker region. Therefore, marker editing processing is performed in the following manner: the marker region is masked with respect to an image signal that has been read by an ordinary reading speed for a life-size image; and the image signal of a life-size is supplied to color printer section B so that the life-size image of a region outside the marker region is formed.

When the M and C images are formed and the Bk image is superimposed, a copy can be obtained in which: the variable magnification processing region designated with a color marker is enlarged to a variable magnification size designated by another color marker; the color of the image is converted to blue and recorded; and the image outside the variable magnification processing region is recorded in a life-size under the condition that the color is black.

In the case of reduction processing, image recording may be performed in the same manner. In the case where color conversion is not performed, a Bk image of life-size and a Bk image of variable magnification are respectively formed and superimposed.

In the aforementioned example, partial variable magnification processing and partial color conversion, which are indicated by a double marker, are combined so as to be carried out. Instead of the variable magnification processing indicated by the double marker, the conventional editing processing such as half-tone, inversion and masking/trimming may be combined and carried out.

Figure 17:
FIG. 17 is a schematic illustration showing an example in which double marker variable magnification and masking processing are combined.

In this case, half-tone and inversion mean half-tone and inversion processing performed on a region designated by a color marker. When masking and trimming are combined, it is possible to enlarge an image inside the inner region to the outer marker region as shown in FIG. 17, and it is also possible to make a region inside the inner marker region to be white. In the other words, in the example of FIG. 17, the image data inside the inner marker region is not outputted. On the contrary, it is also possible to output only a region inside the inner marker.

Half-tone, inversion and masking/trimming are combined when editing data is set in the process of prescanning as shown in FIG. 14.

Combination of double marker variable magnification processing and other marker editing processing can be realized when editing data shown in FIG. 14 in which a marker region signal and various processing modes are combined is stored in the judgment information memory circuit 105.

Editing data shown in FIG. 14 is information of 8 bits per one pixel, including: information showing whether half-tone, inversion, trimming, masking and color conversion are conducted or not; information showing conversion color in color conversion processing; and region signal information (A) and (B) showing variable magnification processing region A and variable magnification size B. When the aforementioned editing data is used, the direction of processing of half-tone, inversion and masking/trimming can be given to double marker variable magnification processing.

Figure 15:
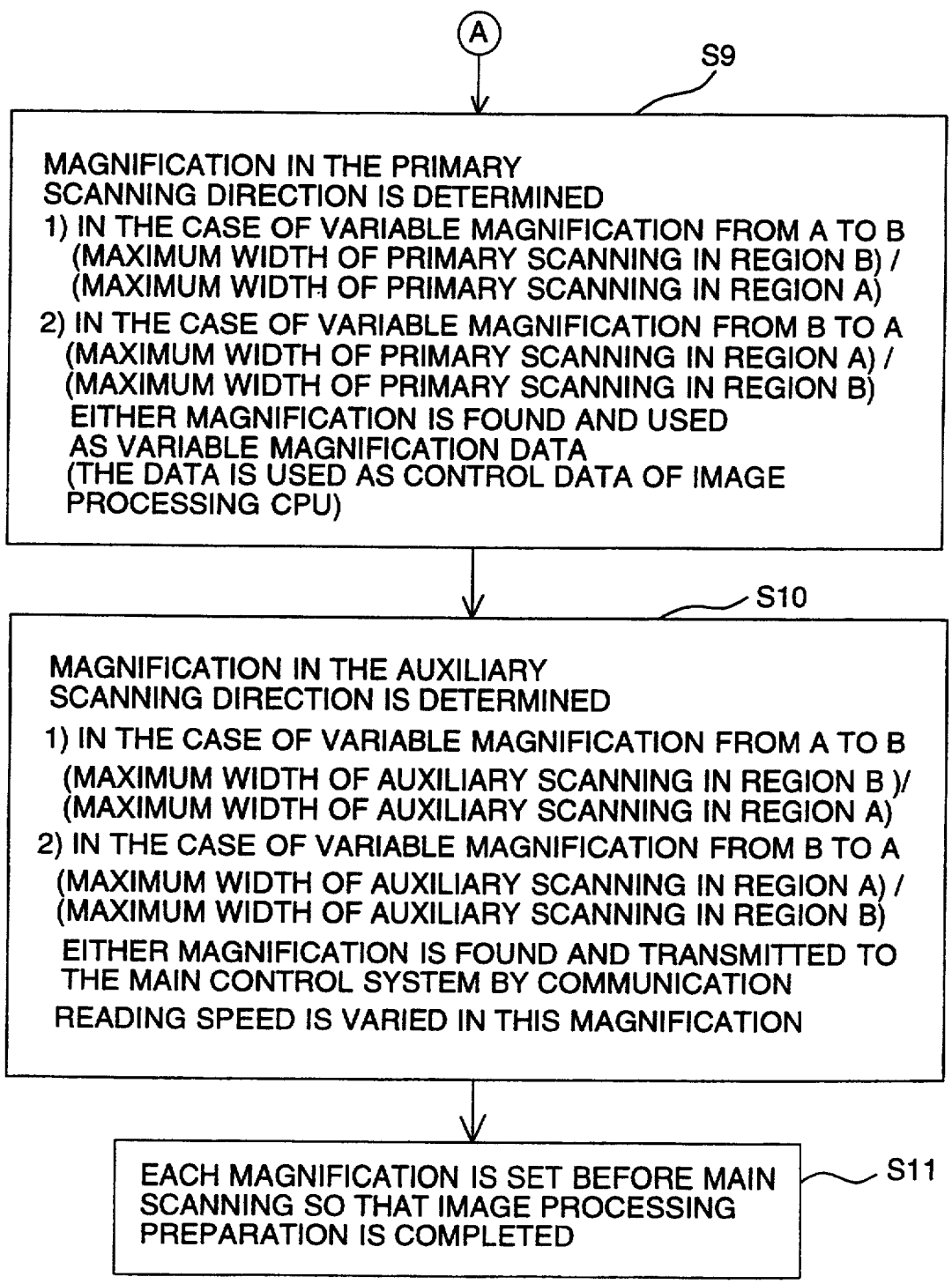
FIG. 15 is a flow chart showing the procedure of double marker variable magnification processing.
Figure 16:
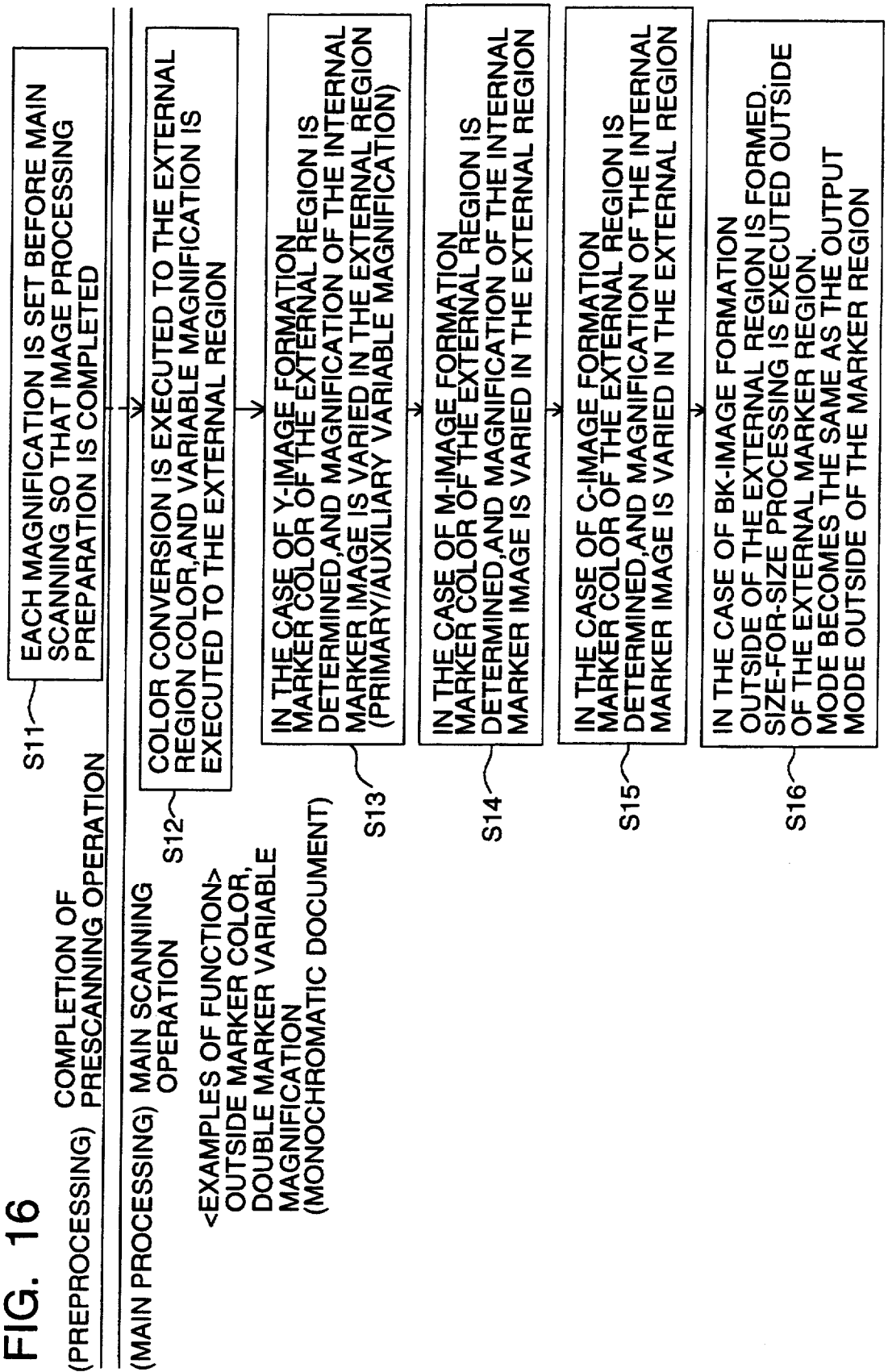
FIG. 16 is a flow chart showing the procedure of double marker variable magnification processing.

With reference to the flow charts shown in FIGS. 15 and 16, the flow of partial variable magnification processing (double marker variable magnification processing) in which a color marker is used will be explained as follows.

First, an operator encircles a region on a document to be magnified and an image region after variable magnification with markers of different colors so that a double loop can be formed (S1).

Then, the double marker document is set on a copier, and a double marker variable magnification mode is selected (S2).

Successively, a start button is pressed so that a prescanning operation is carried out (S3).

Regions A and B respectively showing the variable magnification processing region and variable magnification size (image region after variable magnification processing) designated by color markers are detected from the color image signal of the document provided through the aforementioned prescanning operation. Region signals A and B are stored in the judgment information memory circuit 105 (S4; variable magnification condition detection means). In the above explanation, region A denotes the variable magnification processing region, and region B denotes the variable magnification size. However, in the flow chart shown in FIG. 15, regions A and B only denote the designation of a double closed loop.

The maximum region width in the primary scanning direction in region A is calculated in accordance with region signal A stored in the judgment information memory circuit 105 (S5). Also, the maximum region width in the auxiliary scanning direction is calculated (S6). The results of calculation are stored as control data of CPU 71.

The maximum region width in the primary scanning direction in region A is calculated in accordance with region signal A stored in the judgment information memory circuit 105 (S5). Also, the maximum region width in the auxiliary scanning direction is calculated (S6). The results of calculation are stored as control data of CPU 71.

In the same manner, the maximum region width in the primary scanning direction in region B is calculated in accordance with region signal B stored in the judgment information memory circuit 105 (S5). Also, the maximum region width in the auxiliary scanning direction is calculated (S8). The results of calculation are stored as control data of CPU 71.

S5 to S8 described above correspond to the region size detection means.

In accordance with the maximum region widths of regions A and B in the primary scanning direction, the variable magnification ratio in the primary scanning direction is calculated (S9). In the case of variable magnification from region A to region B, that is, in the case where region A denotes the variable magnification processing region and region B denotes the variable magnification size (image region after variable magnification processing), the variable magnification ratio is calculated by (the maximum width of the primary scanning direction in region B)/(the maximum width of the primary scanning direction in region A). On the contrary, in the case of variable magnification from region B to region A, the variable magnification ratio is calculated by (the maximum width of the primary scanning direction in region A)/(the maximum width of the primary scanning direction in region B).

In the same manner, in accordance with the maximum region widths of regions A and B in the auxiliary scanning direction, the variable magnification ratio in the auxiliary scanning direction is calculated (S10).

S9 and S10 described above correspond to the variable magnification ratio setting means.

The calculated variable magnification ratios of the primary and auxiliary scanning directions are transmitted to the control system of the apparatus through a communication means, and the reading speed is controlled correspondingly to the calculated variable magnification ratio.

Each variable magnification ratio is set before prescanning and the image processing preparation is completed (S11).

After the aforementioned prescanning operation has been completed and the variable magnification ratio has been set (S11), the main scanning operation is carried out. For example, the following conditions are set in the case of a monochromatic document: enlarging processing is carried out when the region is designated with a double marker (that is, the inner region is enlarged to the outer region); and the variable magnification processing region is subjected to color-conversion so that the color can be converted into a marker color used for the outside closed loop of the double marker (S12).

First, in the formation of a Y-image, reading is performed in accordance with the variable magnification ratio of the auxiliary scanning direction that has been previously set in prescanning, and only a variable magnification processing region designated as the inner region of the double marker is extracted from the region that has been read. Then, the extracted region is subjected to color-conversion in accordance with the decision by the outside marker color. Moreover, an enlargement processing operation of the primary scanning direction is carried out by means of interpolating calculation in accordance with the variable magnification ratio of the primary scanning direction that has been previously set in prescanning. Then, the formation Y-image is carried out in accordance with the signal obtained by this processing (S13).

The same processing is conducted on M and C images (S14 and S15). When the Y, M and C images are superimposed, the image in the variable magnification processing region is enlarged in accordance with the designation, and the color of the image is converted into the outside color. In this way, the image is recorded.

In the case where the designation of color conversion is red that can be obtained when magenta M and yellow Y are superimposed, it is not necessary to form a cyan C image. In the case where the designation of color conversion is green that can be obtained when cyan C and yellow Y are superimposed, it is not necessary to form a magenta M image. When color density is designated for each of Y, M and C color toners, various conversion colors can be produced by superimposing three or two colors.

Life-size and monochromatic recording is performed in a region except for the region designated by the color marker. Therefore, in the formation of a Bk image, an image signal outside of the marker designated region is extracted from the image signal obtained through the reading speed corresponding to the life-size image formation, and the image is outputted to the printer section without conducting variable magnification processing in the variable magnification processing circuit. In this way, the image Bk outside of the marker designated region can be formed (S16).

In the above example, the document is monochromatic, however, the present invention is not limited to a monochromatic document. The present invention may be applied to a color document. However, in the case of a color document, a discrimination can not be made between the region designated by a color marker and the document image. In order to solve the problems, the following measures may be taken: as the present applicant has proposed before, a fluorescent marker having high reflectivity is used for region designation so that a discrimination can be made between the image portion and the marker designation region (disclosed in Japanese Patent Publication Open to Public Inspection No. 145630/1992). Alternatively, the following method may be employed: the variable magnification region (variable magnification processing region and variable magnification size) of an original color document is designated on a monochromatic portion or a white portion on the original color document with a color marker; before the original document is read, the monochromatic portion or the white portion is read so that the processing mode is set; and then the original color document is read (disclosed in Japanese Patent Publication Open to Public Inspection No. 134980/1992).

In this example the image signal that has been subjected to variable magnification processing is outputted to a color printer section. However, the present invention is not limited to the specific example, and the image signal may be outputted to a display device such as a CRT.

As explained above, according to the image processing apparatus of the present invention, a region on the document to be magnified and an image range (variable magnification size) after the variable magnification processing can be designated and set on the document with a color marker. Therefore, it is not necessary to designated the variable magnification ratio with a numerical value in the variable magnification processing. Accordingly, the variable magnification ratio can be easily set in the variable magnification processing.

What is claimed is:

1. An image processing apparatus for changing an image size, comprising:
    an image reader to scan a document to photoelectrically read an original image and to generate color image signals, wherein the document is marked with two kinds of color markers differing in color to designate a pre-change region in which an image size is to be changed and a post-change region indicating a region after the image size has been changed, the pre-change region and the post-change region being designated by double-looped marked lines differing in color;
    a condition detector to detect the pre-change region and the post-change region from the color image signals and to obtain a magnification of the image size change on the basis of the pre-change region and the post-change region; and
    a magnification processor to process image signals to change the image size in accordance with the magnification.

2. The apparatus of claim 2, wherein the condition detector comprises a size detector to detect the dimensions of the double loops in both primary and sub scanning directions, and the condition detector obtains the magnifications in both the primary and sub scanning directions on the basis of the dimensions obtained from the double loops.

* * * * *

UNITED STATES PATENT AND TRADEMARK OFFICE
CERTIFICATE OF CORRECTION

PATENT NO. : 5,363,211
DATED : November 08, 1994
INVENTOR(S) : Takashi HASEBE et al It is certified that error appears in the above-indentified patent and that said Letters Patent is hereby corrected as shown below:

Claim 2, Column 14, Line 35, "claim 2" should read --claim 1--.

Claim 2, Column 14, Lines 37 and 41, "double loops" should read --double-looped marked lines--.

Signed and Sealed this

Sixteenth Day of May, 1995

*Attest:*

*Attesting Officer*

BRUCE LEHMAN

*Commissioner of Patents and Trademarks*